March 27, 1928.  D. APRIL  1,664,342
PARKING BUMPER FOR AUTOMOBILES
Filed April 2, 1927
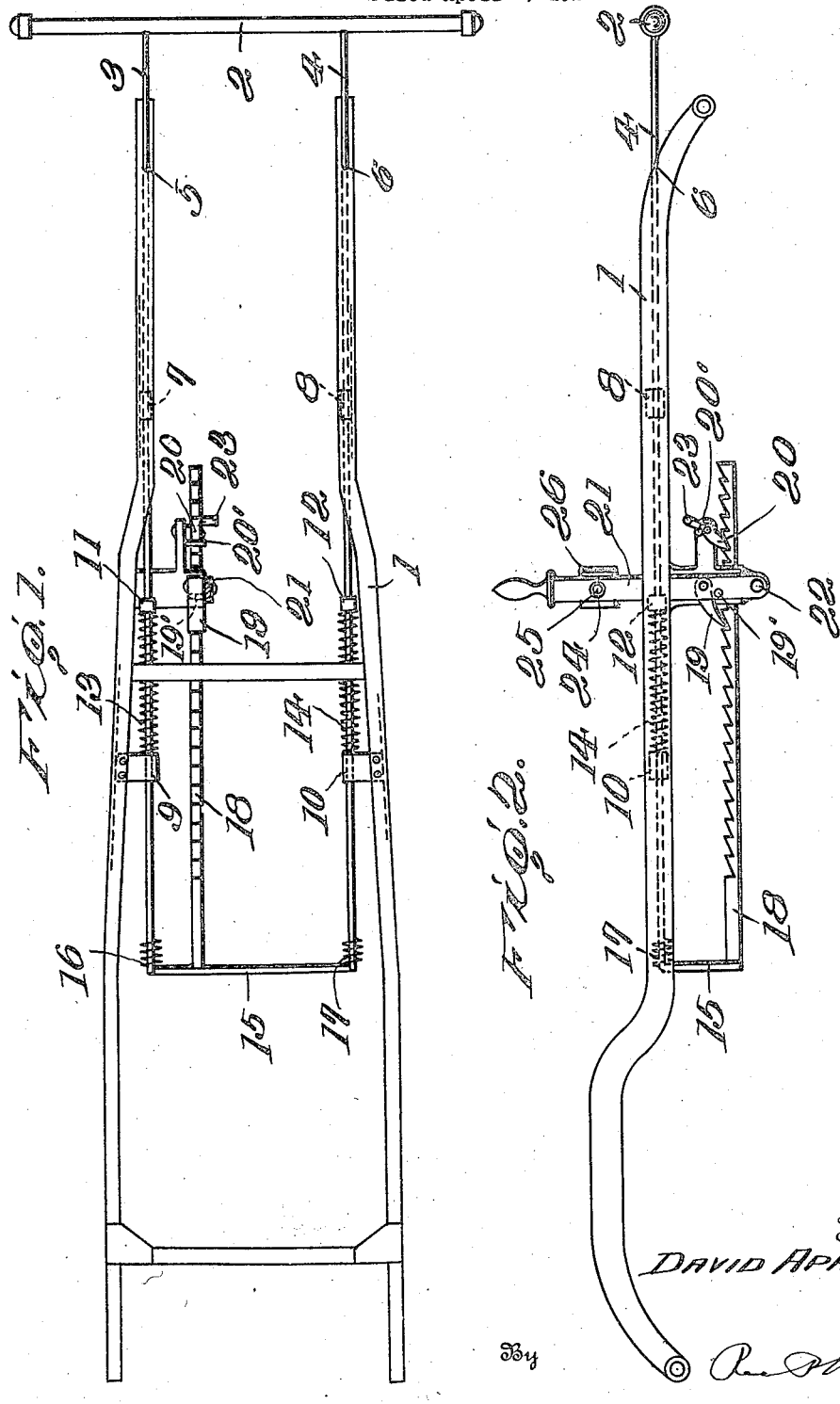
Inventor
DAVID APRIL.
By
Attorney Patented Mar. 27, 1928.

1,664,342

UNITED STATES PATENT OFFICE.

DAVID APRIL, OF WASHINGTON, DISTRICT OF COLUMBIA.

PARKING BUMPER FOR AUTOMOBILES.

Application filed April 2, 1927. Serial No. 180,502.

This invention relates to certain new and useful improvements in parking pumpers for automobiles, the object being to provide a bumper which can be extended by the operator of the vehicle so as to prevent drivers from parking their cars too close to the vehicle equipped with the extensible bumper, whereby the operator will have sufficient space in the parking line for removing the vehicle thereby overcoming difficulties now existing in parking cars.

Another object of my invention is to provide an extensible bumper which can be used either in an extended or withdrawn position, the construction of the same being such that the thrust is not directly upon the chassis of the vehicle in either position.

Another object of my invention is to provide a bumper which is moved into extended position by springs so that the impact or thrust is absorbed by the spring when the bumper is brought into engagement with any object.

Another and further object of the invention is to provide novel means for withdrawing the bumper after it has been extended, the construction being such that when the bumper is in withdrawn position, any thrust upon the bumper will not injure the operating means in any way.

Another and further object of the invention is to provide a bumper which is exceedingly simple and cheap in construction and one which can be readily attached to any of the well known makes of motor vehicles now in use.

Other and further objects and advantages of the invention will be hereinafter set forth and the novel features thereof defined by the appended claims.

In the drawings,

Figure 1 is a top plan view of a chassis of a motor vehicle showing one embodiment of my invention thereto; and Figure 2 is a side elevation of the same.

In the embodiment of my invention as herein shown, I have illustrated the same arranged on a Dodge chassis, but, it is, of course, understood that the same can be applied without changing the construction to any extent to any other chassis.

In the drawing 1 indicates a chassis which is formed of the usual channel iron and 2 a bumper which is carried by the forward ends of parallel bars 3 and 4 extending through openings 5 and 6 in the downwardly extending forward ends of the chassis. These bars are mounted in guides 7 and 8 arranged within the channels of the chassis and guide bearings 9 and 10 extending outwardly as clearly shown so as to guide the bars parallel.

The bars 3 and 4 carry fixed sleeves 11 and 12 and are surrounded by coil springs 13 and 14 between the sleeves 11 and 12 and the bearings 9 and 10, these springs being shown in a compressed position with the bumper in a withdrawn position, the spring having a tendency to normally force the bumper into an extended position.

The rear ends of the bars 3 and 4 are connected together by a bar 15 and the rear ends of the bars are surrounded by coil springs 16 and 17 forming shock absorbers for the bumper when the same is released and forced forwardly by the springs 13 and 14.

While I have shown the bars 3 and 4 arranged within the channels of the side bars of the chassis, it is, of course, understood that the bearings could extend outwardly so that the bars 3 and 4 would be parallel with the chassis instead of within the channels thereof and therefore I do not wish to limit myself to any particular manner of mounting the bars 3 and 4 of the bumper.

In order to provide means for holding the bumper in an extended position and to withdraw the same after it has been extended by abutting the bearings 9 and 10, I provide the bar 15 with a rack bar 18 which is adapted to be engaged by an operating pawl 19 and a retaining pawl 20. The operating pawl 19 is carried by a lever 21 pivotally mounted on a suitable bracket at 22 so that when the lever is oscillated, the rack bar can be moved rearwardly in order to withdraw the bumper after it has been extended.

The movement of the pawl 19 is limited by a pin 19' and the movement of the pawl 20 by a pin 21', the pawl 20 being provided with an extension 23 which is adapted to be engaged by the lever 21 when moved into an extreme forward position so as to throw the pawl 20 out of engagement with the rack, in which position the pawl 19 is also out of engagement so that the frame of the bumper formed of the bars 3, 4 and 15 is released and the springs 13 and 14 force the bumper into an extended position. In the extended position the springs still act to receive the thrust of the bumper. When in a withdrawn position, the springs are under tension so that any impact or thrust on the bumper 2 will allow the bumper to move rearwardly to receive the thrust so as to relieve the chassis of the thrust. It will be noted that by having the pawls engaging the rack as herein shown and described, the pawls will ride over the teeth of the rack and be forced inwardly.

In order to provide means for locking the lever so as to prevent anyone else from operating the bumper but the owner of the vehicle, I provide the lever with an opening 24 into which is adapted to extend a bolt 25 of a lock 26.

In the drawing I have illustrated my bumper in position to be used on the forward end of the motor vehicle, but it is, of course, understood that it could be used on the rear end or two of the bumpers could be used so that one would extend to the front of the vehicle and the other to the rear.

In the operation of the bumper as herein shown and described when the driver enters a line to park, it is only necessary to move the lever 21 forward which throws the pawls out of engagement with the rack and the springs 13 and 14 force the bumper forward into extended position and as it reaches its limit of movement, the springs 16 and 17 relieve the shock so as to prevent the same from being injured. When it is desired to withdraw from the line of cars, the operator operates the lever 21 backward and forward so as to withdraw the bumper which will leave sufficient space for the operator to move out of the line of parked cars.

From the foregoing description it will be seen that I have provided a novel form of parking bumper which is so constructed that a thrust on the same either in an extended or withdrawn position will not injure the operating means in any way as a spring bumper is formed when the bumper is in either an extended or withdrawn position.

What I claim is:—

1. The combination with a motor vehicle, of guide bearings carried by the frame of the vehicle, a bumper having supporting bars slidably mounted in said bearings, means for normally holding said bumper in extended position and pawl and ratchet mechanism for withdrawing said bumper after being extended.

2. The combination with a motor vehicle, of a bumper arranged beyond the wheels of the vehicle, bars for supporting said bumper, means for supporting said bars, springs for forcing said bumper into extended position, means for withdrawing said bumper after being extended and means for locking said first-mentioned means.

3. The combination with a motor vehicle, of guide bearings carried by the frame of the vehicle, bars slidably mounted in said guide bearings, a bumper connecting the forward ends of said bars, springs for forcing said bumper into extended position, means for holding said bumper in withdrawn position against the tension of said springs and pawl and ratchet mechanism for withdrawing said bumper.

4. The combination with a motor vehicle, of an extensible bumper slidably mounted on said vehicle, springs for extending said bumper, means for withdrawing said bumper after being extended, means for holding said bumper in withdrawn position, said last-mentioned means being operable by the withdrawing means to release said bumper.

5. The combination with a motor vehicle, of an extensible bumper slidably mounted thereon, springs for moving said bumper into extended position, a rack bar having a connection with said bumper, a pivoted pawl engaging said rack bar for holding said bumper in withdrawn position against the tension of said springs, and a lever carrying a pivoted pawl engaging said rack bar for withdrawing said bumper, said lever being capable of releasing the first-mentioned pawl on the forward movement thereof to allow said bumper to move into extended position.

6. The combination with a motor vehicle, of an extensible bumper slidably mounted thereon, springs for moving said bumper into extended position, a rack bar having a connection with said bumper, a pivoted pawl engaging said rack bar for holding said bumper in withdrawn position against the tension of said springs, a lever carrying a pivoted pawl engaging said rack bar for withdrawing said bumper, said lever being capable of releasing the first-mentioned pawl on the forward movement thereof to allow said bumper to move into extended position, and means for locking said lever.

7. The combination with a motor vehicle, of guide bearings carried by the frame of the vehicle, bars slidably mounted in said guide bearings, a bumper connecting the forward ends of said bars, said bars being connected at the rear end by a cross bar, a rack carried by said cross bar, a pivoted lever having a pawl engaging said rack for moving said bars in one direction, springs surrounding said bars for moving said bars in a reverse direction, a pivoted pawl engaging said rack for holding said bars in withdrawn position, said pawl having an extension in the path of travel of said lever for moving said pawl out of engagement with said rack to release said bars and means for locking said lever.

8. The combination with a motor vehicle, of guide bearings carried by the chassis of the vehicle, bars slidably mounted in said guide bearings, a bumper connecting the forward ends of said bars, a cross bar connecting the rear ends of said bars, springs disposed around said bars adjacent said cross bar, springs surrounding said bars adjacent the rear bearings, sleeves fixed on said bars engaged by said springs, said springs having a tendency to move said bumper into extended position and means for withdrawing said bumper after being extended.

9. The combination with a motor vehicle, of a bumper arranged in advance of the wheels of said vehicle, a pair of bars connected to said bumper, means for guiding and supporting said bars within the frame of the vehicle, springs surrounding said bars for moving said bumper into extended position, and means arranged within the vehicle for moving said bars inwardly after they have been extended by said springs, said last mentioned means being operable by the withdrawing means to release said bumper.

10. The combination with a motor vehicle, of a bumper arranged in advance of the wheels of said vehicle, a pair of bars connected to said bumper, means for guiding and supporting said bars within the frame of the vehicle, springs surrounding said bars for moving said bumper into extended position, means arranged within the vehicle for moving said bars inwardly after they have been extended by said springs, and means for holding said bars in withdrawn position, said last mentioned means being operable by the withdrawing means to release said bumper.

11. The combination with a motor vehicle, of a pair of bars slidably mounted within the frame of the vehicle, a bumper carried by the forward ends of said bars, springs surrounding said bars for holding said bumper in extended position, a pawl and rack mechanism for withdrawing said bars, means for holding said bars in withdrawn position, said means being operable by said pawl and rack mechanism to release said bars to allow said bumper to move into extended position.

In testimony whereof I hereunto affix my signature.

DAVID APRIL.